UNITED STATES PATENT OFFICE.

JOHN SHECKLER, OF MILESBURG, PENNSYLVANIA.

COMPOUND FOR EXTERMINATING THISTLES.

SPECIFICATION forming part of Letters Patent No. 558,991, dated April 28, 1896.

Application filed October 16, 1895. Serial No. 565,868. (No specimens.)

*To all whom it may concern:*

Be it known that I, JOHN SHECKLER, a citizen of the United States of America, residing at Milesburg, in the county of Centre and State of Pennsylvania, have invented certain new and useful Improvements in Compounds for Exterminating Thistles, of which the following is a specification.

The object of this invention is to produce a compound which will effectually eradicate blue thistles, and while it is especially adapted for that purpose will also be useful in destroying other vegetable growths to which it may be applied and which it is desired to exterminate.

A further object of the invention is the production of a compound to accomplish the aforesaid results which will prove comparatively inexpensive to produce and apply and furthermore will be highly efficient and satisfactory.

With these and other objects in view the invention consists in the compound consisting of the ingredients named in the proportions to be hereinafter set forth and specifically claimed.

In carrying out my invention I employ salt, one barrel; kerosene-oil, one gallon; vitriol, one pint; pure wood-ashes, one peck. The vitriol is pulverized and thoroughly mixed with the other ingredients in an earthen or iron vessel. This should be applied to the stalk or root after it is cut close to the ground, such application destroying the root and preventing further growth.

It will be understood that the amount compounded may be varied to suit the requirements of the trade, the ingredients being proportioned as before stated.

The objects and advantages of the foregoing will be understood and appreciated by those familiar with the art, and it is noted that slight changes may be made in the proportions, and yet the spirit of the invention will not be departed from.

Having fully described my invention, what I claim as new, and desire to secure by Letters Patent, is—

1. A compound for exterminating thistles consisting of salt, kerosene-oil, vitriol and wood-ashes, substantially as described.

2. A compound for exterminating thistles consisting of salt, one barrel, kerosene-oil, one gallon, vitriol, one pint, and pure wood-ashes, one peck as described.

In testimony whereof I affix my signature in presence of two witnesses.

JOHN SHECKLER.

Witnesses:
W. H. MUSSER,
A. A. DALE.